(12) United States Patent
Ruopp et al.

(10) Patent No.: US 11,621,453 B2
(45) Date of Patent: Apr. 4, 2023

(54) FOLDABLE GASKET WITH CONTINUOUS SEALING CONTOUR

(71) Applicant: Reinz-Dichtungs-GmbH, Neu-Ulm (DE)

(72) Inventors: Andreas Ruopp, Merklingen (DE); Tobias Wolf, Burlafingen (DE); Johann Waldvogel, Krumbach (DE); Michael Heuschmid, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 141 days.

(21) Appl. No.: 17/369,820

(22) Filed: Jul. 7, 2021

(65) Prior Publication Data
US 2022/0013838 A1    Jan. 13, 2022

(30) Foreign Application Priority Data
Jul. 8, 2020    (DE) .......................... 102020208585.4

(51) Int. Cl.
*F16J 15/02*    (2006.01)
*H01M 50/207*    (2021.01)
(Continued)

(52) U.S. Cl.
CPC ......... *H01M 50/207* (2021.01); *F16J 15/022* (2013.01); *F16J 15/067* (2013.01);
(Continued)

(58) Field of Classification Search
CPC ........... H01M 2220/20; H01M 50/224; H01M 50/231; H01M 50/207; F16J 15/122; F16J 15/067; F16J 15/022
See application file for complete search history.

(56) References Cited

U.S. PATENT DOCUMENTS 3,231,289 A * 1/1966 Carrell .................. F16J 15/108
277/632
3,738,670 A * 6/1973 Jelinek .................. F16J 15/121
49/482.1
(Continued)

FOREIGN PATENT DOCUMENTS

DE          4312629 C1 * 11/1994 ......... F01M 11/0004
DE    102019213614 A1 *  3/2021 ............. F16J 15/067
(Continued)

*Primary Examiner* — Eugene G Byrd
(74) *Attorney, Agent, or Firm* — McCoy Russell LLP (57) ABSTRACT

The present disclosure relates to a seal for sealing an inner chamber of a housing from an exterior of the housing, comprising at least one sealing layer that has: at least two rigid sealing layer portions having a respective support element, wherein the rigid sealing layer portions are interconnected by a flexible sealing layer portion, which consists of or comprises at least in part an elastomer; and at least one sealing contour, which extends continuously over the different sealing layer portions, wherein the support elements each comprise, in an end region adjoining the flexible sealing layer portion, at least one through-opening, through which the elastomer of the flexible sealing layer portion extends, and the end region of each support element is coined in at least one first end-side coining region and is enclosed by the elastomer in the first end-side coining region at least in some regions.

12 Claims, 10 Drawing Sheets

(51) Int. Cl.
   H01M 50/224   (2021.01)
   H01M 50/231   (2021.01)
   F16J 15/12    (2006.01)
   F16J 15/06    (2006.01)

(52) U.S. Cl.
   CPC ......... F16J 15/122 (2013.01); H01M 50/224 (2021.01); H01M 50/231 (2021.01); *H01M 2220/20* (2013.01)

(56) References Cited

U.S. PATENT DOCUMENTS

| | | | | |
|---|---|---|---|---|
| 4,572,522 | A * | 2/1986 | Smagatz | F16J 15/121 |
| | | | | 277/632 |
| 5,618,047 | A * | 4/1997 | Belter | F16J 15/067 |
| | | | | 277/650 |
| 6,553,664 | B1 * | 4/2003 | Schenk | F16J 15/067 |
| | | | | 29/888.3 |
| 10,588,248 | B1 * | 3/2020 | Falslev | H05K 9/0081 |
| 2002/0135137 | A1 * | 9/2002 | Hammi | B64D 37/005 |
| | | | | 277/637 |
| 2005/0230925 | A1 * | 10/2005 | Browne | B60J 10/244 |
| | | | | 277/300 |
| 2010/0166965 | A1 * | 7/2010 | Salameh | B29C 45/14016 |
| | | | | 427/372.2 |
| 2012/0187638 | A1 * | 7/2012 | Bauer | F16J 15/108 |
| | | | | 264/261 |
| 2013/0049307 | A1 * | 2/2013 | Jeanne | F16J 15/067 |
| | | | | 277/632 |
| 2013/0049308 | A1 * | 2/2013 | Raillard | F16J 15/064 |
| | | | | 277/648 |
| 2017/0074401 | A1 * | 3/2017 | Saxton | F16J 15/022 |
| 2020/0408303 | A1 * | 12/2020 | Gruhler | F16J 15/0818 |
| 2022/0154825 | A1 * | 5/2022 | Kaiser-Krug | H01M 50/204 |

FOREIGN PATENT DOCUMENTS

| | | | | |
|---|---|---|---|---|
| EP | 2479461 A1 * | 7/2012 | ....... | B29C 45/14467 |
| FR | 3122041 A1 * | 10/2022 | | |
| JP | 2005214222 A * | 8/2005 | | |
| JP | 2014074453 A * | 4/2014 | ............. | F16J 15/022 |

* cited by examiner

FOLDABLE GASKET WITH CONTINUOUS SEALING CONTOUR

CROSS-REFERENCE TO RELATED APPLICATION

The present application claims priority to German Patent Application No. 10 2020 208 585.4, entitled "FOLDABLE GASKET WITH CONTINUOUS SEALING CONTOUR," and filed on Jul. 8, 2020. The entire contents of the above-listed application are hereby incorporated by reference for all purposes.

TECHNICAL FIELD

The present disclosure relates to a seal, such as a gasket, for sealing a gap in a housing, said gap extending around an inner chamber of the housing, and thus for sealing the inner chamber from an exterior of the housing, comprising at least one sealing layer. Specifically, the present disclosure relates to a frame seal that provides sealing between at least two components of the housing, for example a bottom part and a top part of the housing, for example of a motor vehicle battery housing or motor vehicle battery box housing.

BACKGROUND AND SUMMARY

Conventionally, an all-round gap in a housing, between a bottom part and a top part of the housing, for example a battery box trough and a battery box lid of a battery box, is sealed by gluing the top part to the bottom part in the gap. However, this is disadvantageous in that the housing is difficult to dismantle again and then re-assemble in a sealed manner. Alternatively, therefore, seals are also placed in the gap all the way around the rim of the bottom part before the lid is releasably fastened, for example screwed on. For this purpose, all-round elastomer seals are often used. The drawback of these is that, due to the flexibility and deformability of the seal as a whole, the assembly is not very secure or greater assembly work is required since, for example, a corresponding groove for the elastomer seal has to be milled or cast in the housing.

Moreover, housings like those of battery boxes often have large dimensions, such that the bottom part closed by the top part has a length and/or width of more than one metre. For example, battery boxes for traction batteries in the vehicle are typically given dimensions of more than 1.3 m in length and more than 0.8 m in width.

In this case, therefore, pure elastomer seals are disadvantageous in that they can be incorrectly positioned or may slip, meaning the assembly is not very secure. On the other hand, conventional, single-part frame seals having a continuous metal or plastics support on which a rubber sealing lip is moulded as a sealing contour are difficult to manufacture in the required dimensions. To manufacture the support, very large moulds are required in this case. There are large amounts of material rejects too. Transport and assembly are also complex.

On the basis of the above, therefore, the object of the present disclosure is to provide an improved seal for sealing housings that overcomes the aforementioned disadvantages.

The present disclosure relates to a seal, such as a gasket, for sealing a gap in a housing and thus for sealing an inner chamber of the housing from an exterior of the housing. A gap of this kind can, for example, be the all-round gap between a trough and a lid of the housing, for example of a battery box. When used as intended, a seal as described below is arranged in the gap, for example between the trough and the lid of the housing, i.e. all the way around along the gap between said two parts.

Therefore, and as will be described in more detail below, the seal may comprise an opening that largely corresponds to the dimensions of the inner chamber of the housing in the plane of the seal and is largely or entirely enclosed by the seal. The term "largely" can thus be understood as meaning at least in part, i.e. in part, mostly, or entirely. The opening can also be referred to as an aperture and/or a cut-out. The seal or gasket thus serves to seal the gap extending around the inner chamber of the housing, by means of at least one sealing layer.

The sealing layer, which may be a planar sealing layer, comprises at least two rigid sealing layer portions, which are interconnected by a sealing layer portion that, unlike the rigid sealing layer portions, is flexible. In this case, the rigid sealing layer portions each comprise a corresponding rigid support element, which is for example a metal support element. The support elements can be produced so as to comprise or be made of aluminum or so as to comprise or be made of a steel material. In production terms, this is advantageous for the support element configurations yet to be described. The flexible sealing layer portion consists of or comprises at least in part, i.e. in part or entirely, an elastomer.

The sealing layer also comprises at least one sealing contour, for example having one or more respective sealing lips, which extends continuously over the different sealing layer portions. In this case, the continuous sealing contour can be composed of different sealing contour portions—partial sealing contours that are produced in different production steps and/or using different materials. For example, in the region of the rigid sealing layer portions, the sealing contour can be produced having a soft component that provides sealing at the relevant support element, and having the above-mentioned elastomer in the region of the flexible sealing layer portion. In the process, the sealing soft component can likewise consists of or comprises, at least in part, i.e. in part or fully, the elastomer or a different elastomer.

The uninterrupted sealing contour may be formed by the relevant partial sealing contours merging into one another in the different sealing layer portions. It is advantageous if the partial sealing contours merge into one another substantially seamlessly. As a result, at least one uninterrupted sealing contour can be provided along the sealing layer, said contour extending over both the rigid sealing layer portions and the at least one flexible sealing layer portion connecting the rigid sealing layer portions, such that both the rigid sealing layer portions, together with the associated sealing soft components, and the flexible sealing layer portion having the elastomer provide an uninterrupted sealing action as a result of each partial sealing contour.

Alternatively, it is possible to form the at least one uninterrupted sealing contour together with the at least one flexible sealing layer portion to the rigid sealing layer portions, such that the at least one uninterrupted sealing contour and the at least one flexible sealing layer portion are free of transition.

In some embodiments, the number of rigid sealing layer portions may correspond to the number of flexible sealing layer portions connecting the rigid sealing layer portions, and overall rigid and flexible sealing layer portions form a self-contained seal having a self-contained sealing contour, which can have an annular, rectangular or similar shape and extends continuously around the opening. By combining rigid and flexible sealing layer portions, the respective advantages are combined in this case, namely robustness, reliable sealing action and simple assembly on the one hand, and simple manufacture on the other hand.

In addition to simple self-contained seal forms, seals having branches are also conceivable, for example having two window-like inner regions. These can be used when, for example, the battery trough comprises a partition, for example to sealingly separate various battery modules from one another or to sealingly separate an inner chamber having a control device from an inner chamber having one or more battery modules.

The support elements of each rigid sealing layer portion each comprise, in an end region adjoining the flexible sealing layer portion, at least one through-opening through which the elastomer of the flexible sealing layer portion extends. The support elements are thus molded with the elastomer at least in part in the region of the through-opening. In addition, the end region of each support element is coined in at least one first end-side coining region, i.e. one or more end-side coining regions, which is thus a sub-region of the end region. Each end region is also enclosed by the elastomer in the first end-side coining region at least in some regions, i.e. in some regions or entirely. The first end-side coining region is thus molded with the elastomer at least in some regions. As a result of the coining, a thickness of the support element is reduced in the associated coining region compared with an uncoined region of the support elements, for instance in the end region. In this case, the thickness may be measured perpendicularly to the main extension plane of the relevant support element, of the relevant rigid sealing layer portion and/or of the sealing layer and/or of the seal.

Combining the molded through-opening with the molded coining region has the advantage of an interlocking connection between the elastomer and support element. The material transition between the support element and the elastomer has a three-dimensionally distributed shape having part-surfaces of different orientations; this shape disperses, in three dimensions, the forces that arise when the rigid sealing layer portions move, for example tilt, bend and/or fold, with respect to one another in the flexible sealing layer portion, i.e. at the elastomer-support element material transition, thereby reducing local peak stresses. This therefore improves the adhesion of the elastomer to each support element, thus achieving a sturdier, longer-lasting connection between the elastomer and each support element. The shape of the support element having the through-opening and coining region thus assists the chemical adhesion of the elastomer to the support element. The forces that arise when the two rigid sealing layer portions move, for example tilt, bend and/or fold, with respect to one another are dispersed to part-surfaces, which are each broken up by part-surfaces of different orientations, meaning that any tears occurring are stopped at local level.

In an embodiment, the support elements each comprise two or more through-openings. These through-openings can each be configured as slots and/or be arranged in a row transversely to a longitudinal direction of the support elements. In the case of through-openings configured as slots, the longitudinal direction of the slot(s) may be arranged transversely to a longitudinal direction of the relevant support element. In turn, the longitudinal direction of the relevant support element corresponds to the circumferential direction of the sealing layer in the portion in question. As a result, it is simple in manufacturing terms to further increase the surface area over which the above-described forces act and to disperse them over a larger volume in the three-dimensional space and over more part-surfaces of different orientations.

In a further advantageous embodiment, the at least one first end-side coining region adjoins an edge of the through-opening and an end-side edge, adjoining the flexible sealing layer portion, of the relevant support element. In the process, the at least one first end-side coining region may adjoin the edge of the through-opening over less than half a length of the edge of the through-opening. As a result, the elastomer enclosing the first end-side coining region in the region of the through-opening and in the region of the flexible sealing layer portion is connected to the support element reliably. By means of the elastomer in the first end-side coining region, the aforementioned forces are therefore more widely dispersed from the region of the through-opening to the region of the end-side edge, and vice versa.

In another advantageous embodiment, the end region of each support element is also coined in at least one second coining region, i.e. one or more second coining regions, and is enclosed by the elastomer in the second end-side coining region at least in some regions, or in its entirety. In the process, a coining depth of the second end-side coining region is greater than a coining depth of the first end-side coining region. The thickness of each support element in the second end-side coining region is thus thinner than in the first end-side coining region. This is advantageous in that the three-dimensional nature of the material-transition surface is even more pronounced and the aforementioned forces can thus be dispersed even more effectively.

In the process, the at least one second end-side coining region can adjoin the edge of the through-opening and the end-side edge of the relevant support element. As a result, the more pronounced three-dimensional nature of the material-transition surface is combined with a deeper coupling of the elastomer in the through-opening and of the elastomer in the flexible sealing layer portion, such that the aforementioned forces can be dispersed even more effectively. Due to the even more pronounced three-dimensional shape of the material transition, any tearing processes in one direction are stopped at local level, further increasing the stability.

In addition, it can be provided that, except for at the aforementioned edges, the at least one second end-side coining region (which is part of the end region) adjoins the rest of the end region not associated with the second coining region only at the at least one first end-side coining region (which is also part of the end region). This is advantageous in that each support element can be significantly coined locally in the at least one second end-side coining region, meaning that an accordingly good connection can be achieved between the elastomer in the region of the through-opening and the elastomer in the flexible sealing layer portion. At the same time, due to the locally very limited thickness change in the support element, high dimensional accuracy can be achieved, i.e. warping can be reduced and the production accuracy for the seal, and thus the sealing performance, can be increased and assembly simplified. In embodiments of the second end-side coining region, which has a greater coining depth than the first end-side coining region, adjoins the end-side edge of the relevant support element and the through-opening only at the first coining region, the warping that occurs more sharply there only has a local effect on the shape of the through-opening and on the end-side edge, but not on the rest of the support element. As a result, for example deformation in positioning openings and the related problem of the seal getting stuck in production moulds are prevented, and, on the contrary, the advantageous effect of an even more pronounced three-dimensional nature of the material-transition boundary having the above-described advantageous effects is reinforced.

In a further advantageous embodiment, first and second end-side coining regions are arranged alternately on the end-side edge of each support element, for example directly one after the other. In the case of coining regions arranged directly one after the other, the thickness of the support element, with the exception of the production-related transition, may be provided solely by the thickness in the first coining region and the thickness in the second coining region. This leads to an advantageous dispersal of the aforementioned forces.

In a further advantageous embodiment, the elastomer is flush with the relevant support element at the edge of the through-opening, i.e. is flush internally all around the periphery (in an interlocking manner in the through-opening) and/or at the top edge of the support element, for instance in the respective coining regions. The elastomer thus adjoins the surface of the support element over a plurality of surface portions. This also contributes to a sturdy connection between the rigid and the flexible sealing layer portions.

In addition, the support elements can each comprise at least one positioning hole and/or at least one screw hole in the region surrounding the through-opening. In this case, the above-described solution having the reduced warping is advantageous since this prevents the shape of the positioning hole and/or screw hole being impaired by the warping during the production process for the support elements. This allows the seal to be positioned and fastened accurately. Accordingly, the positioning hole and/or screw hole can, in this case, be arranged close to the flexible sealing layer portion or the end region of the support elements.

In a further advantageous embodiment, two rigid sealing layer portions are in each case foldably or bendably interconnected by the one or a flexible sealing layer portion. In the event of folding or bending, the flexible sealing layer portion is typically distorted in line with a radius (which also varies); in the process, it delineates almost a full circle such that the associated rigid sealing layer portions come to rest on one another, by their respective support elements, in a planar manner over a major part of their adjoining surfaces. Alternatively, they can also lie on top of each other in an area spaced from the folding or bending point, and in the remaining area facing the folding or bending point, they can move away from each other at a very acute angle in the direction of the folding or bending point. The seal can accordingly be referred to as a bendable or foldable seal. In this case, the improved dispersal of the bending forces and the resulting higher durability and longer-lasting sealing performance are advantageous since the deformation, i.e. the distortion or folding, around the flexible sealing layer portion is, by definition, accompanied by corresponding bending forces, which thus affect the seal to a lesser extent.

One aspect also relates to a method for producing a seal for sealing an inner chamber of a housing from an exterior of the housing, wherein the housing can be a motor vehicle battery housing or a motor vehicle battery box housing. The seal has at least one sealing layer, which comprises at least two rigid sealing layer portions, having a respective support element, and at least one flexible sealing layer portion, which consists of or comprises, at least in part, an elastomer, and at least one sealing contour, which extends continuously over the different sealing layer portions.

The method is characterised by the following additional method steps: making, such as by means of punching or laser-cutting, at least one through-opening in an end region of each support element; coining each support element in at least one first end-side coining region of the associated end region; partly or fully molding the support elements with the elastomer in the respective coining regions and with the elastomer in the at least one through-opening, thereby forming the flexible sealing layer portion and at least one part of the sealing contour, for example in the sealing contour that is arranged in the flexible sealing layer portion. Alternatively, the formation of the flexible sealing layer portion can also be divided into several steps, for example a first overmoulding as mentioned above together with the formation of a part of the flexible sealing layer portion as well as the part of the sealing contour associated with this portion and the part of the sealing contour associated with the rigid sealing layer portion. In a second step, the remaining part of the flexible sealing layer portion can be injected. Two elements, each containing a rigid sealing layer section, may be joined in this step. Between the at least two overmoulding or injecting steps, e.g. the contours of the flexible sealing layer portions can be machined, for example trimmed, even together with the associated part of the sealing contour. In a further alternative embodiment, for seals that are not quite so large, larger elastomer areas can be injected in one step, and in extreme cases even all flexible sealing layer portions and the entire sealing contour can be moulded in one step. In all the described embodiments, the flexible sealing layer portion can also contain further components other than the elastomer. When the support elements are molded with the elastomer, the support elements, and thus the rigid sealing layer portions associated with the support elements, are therefore interconnected. The above-mentioned method steps may be carried out in the stated order.

Advantages and advantageous embodiments of the method correspond to advantages and advantageous embodiments of the seal.

The features and feature combinations stated above in the description, including in the introductory part, and the features and feature combinations stated below in the description of the drawings and/or shown separately in the drawings can be used in combinations other than those stated in each case, without departing from the scope of the present disclosure. In this respect, the present disclosure should be considered to include and disclose embodiments that are not explicitly shown in the drawings or explained but which arise from and can be produced as a result of feature combinations separated out of the embodiments that are described. Embodiments and feature combinations that consequently do not contain all the features of an original independent claim should also be deemed disclosed. In addition, the present disclosure should be taken to disclose embodiments and feature combinations, including those resulting from the above-described embodiments, that either go beyond or deviate from the feature combinations stated in the back-references of the claims.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The subject matter according to the present disclosure will now be explained in more detail on the basis of the following drawings, but it is not intended to be limited to the specific embodiments shown therein.

BRIEF DESCRIPTION OF THE FIGURES

Example embodiments of the present disclosure will be explained below in more detail on the basis of schematic drawings, in which:

FIGS. 1A-8 are shown approximately to scale.

Like components or those with identical functions have been provided with the same reference numerals in the drawings.

DETAILED DESCRIPTION

Figure 1A:
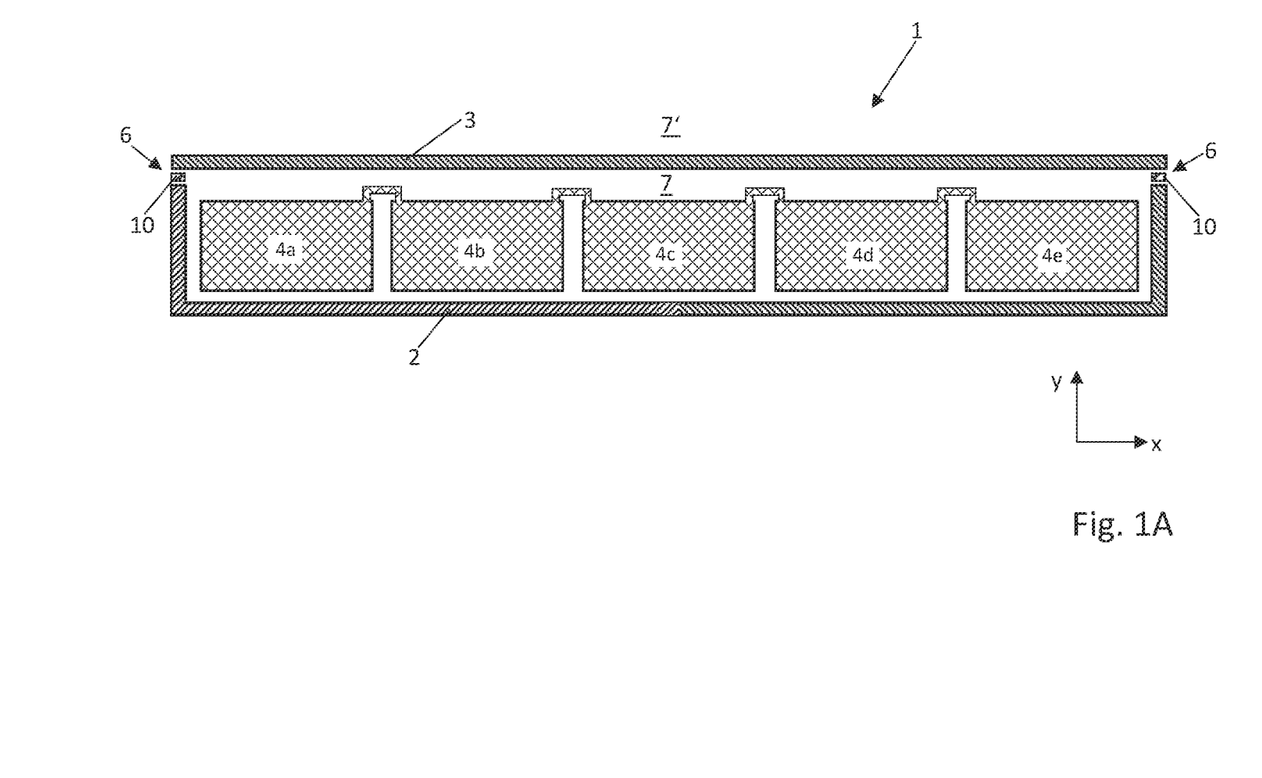
FIG. 1A shows an example housing having battery cells arranged therein and an example seal.

FIG. 1A shows a motor vehicle battery housing as an example housing 1 having, in the present case, battery modules 4a to 4e of a vehicle traction battery arranged therein. The housing 1 has a trough as a bottom part 2 and a lid as a top part 3. The battery modules 4a to 4e are housed in an inner chamber 7 of the housing 1. In this example, the housing 1 comprises a gap 6 (the gap 6 to be sealed) above the battery modules 4a to 4e between the bottom part 2 and the top part 3. Accordingly, in the present case a seal 10 is placed in the gap 6 in order to seal it and thus seal the inner chamber 7 from an exterior 7' of the housing 1. For this purpose, in the present case the seal 10 accordingly extends all around the inner chamber 7 of the housing 1 and, in the example shown, accordingly comprises an opening 13 (FIG. 1B) in which the inner chamber 7 of the housing 1 is located.

Figure 4:
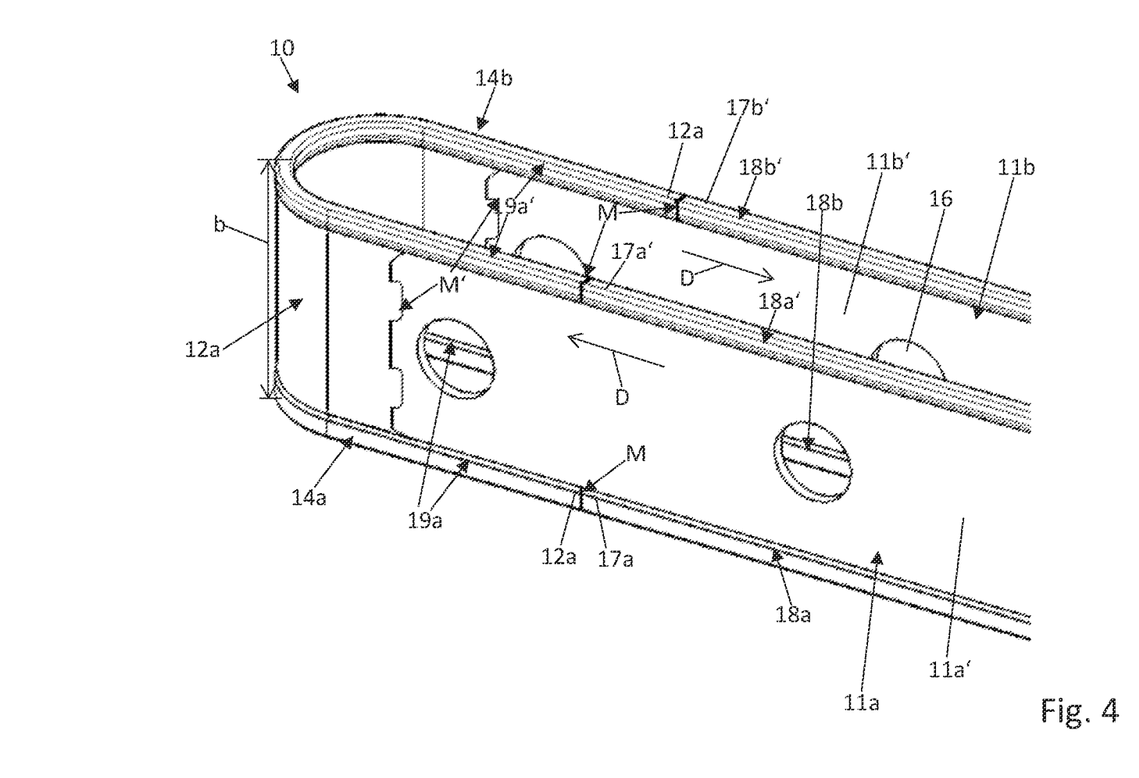
FIG. 4 is a perspective view of a detail of an example embodiment of a seal in the folded state.

Housings 1 of this kind typically have dimensions of more than 1 m, at least in either the length or width direction or in both the length and width directions, such that the seal 10, which may be in the form of a gasket, typically has a length of several metres in a periphery direction D (FIG. 4).

Figure 1B:
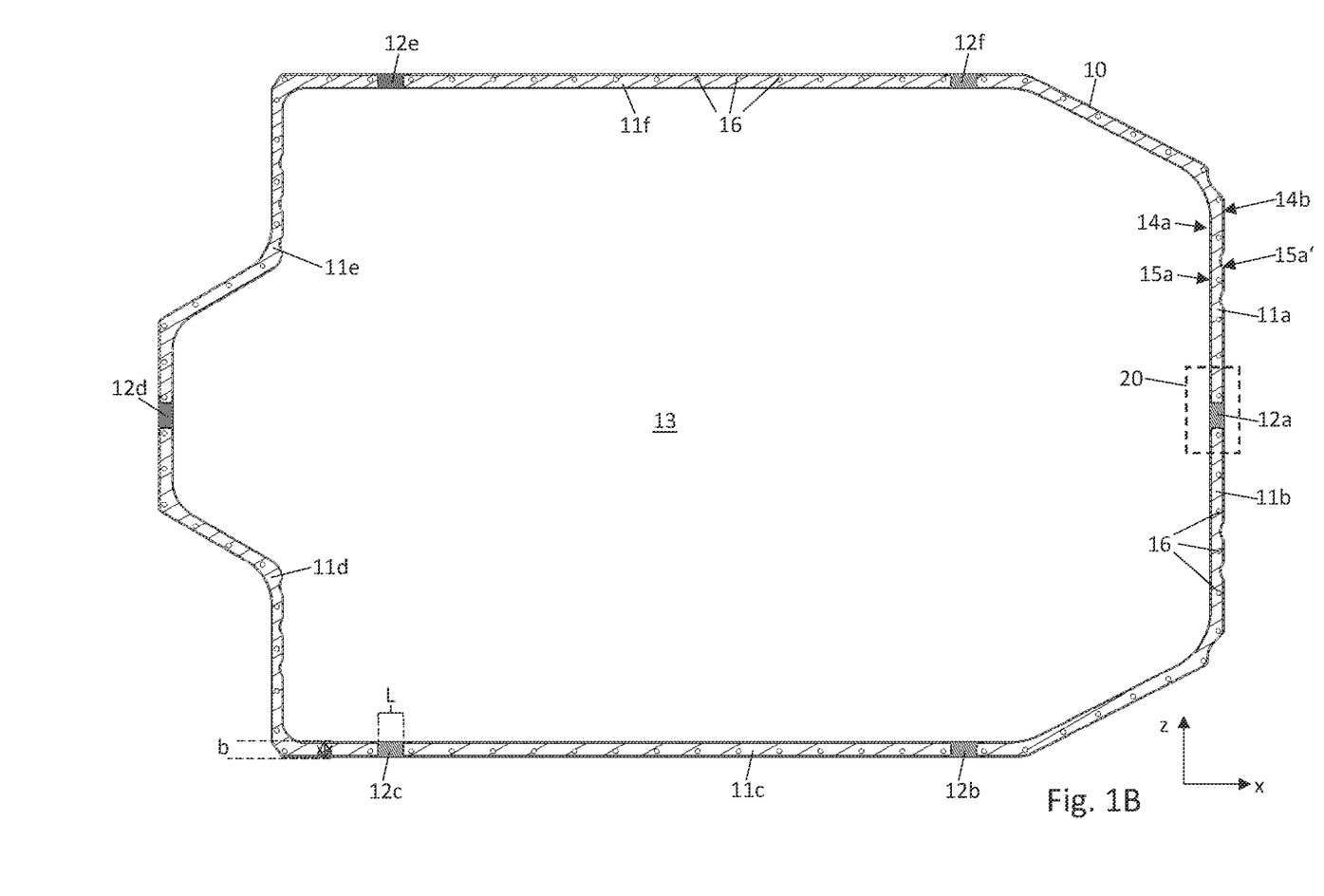
FIG. 1B is a sectional view of an example embodiment of a seal, with a sectional plane parallel to the main extension plane of the seal.

FIG. 1B is a sectional view of an example embodiment of the seal 10, the sectional plane extending in parallel with a main extension plane (in this case the x-z plane) of the seal 10. This embodiment accordingly comprises N rigid sealing layer portions 11a to 11f and N flexible sealing layer portions 12a to 12f which connect the rigid sealing layer portions 11a to 11f, and which connect the respective rigid sealing layer portions 11a to 11f such that two rigid sealing layer portions 11a, 11b are in each case connected by one flexible sealing layer portion 12a. In the example shown, N=6. In the present case, a seal 10 having an opening 13 is accordingly formed by the identical number of rigid and flexible sealing layer portions 11a to 11f, 12a to 12f. A seal 10 of this kind can also be referred to as an annular seal 10. In the present case, the seal 10 comprises an uninterrupted sealing contour 14a at an inner edge 15a, 15b (FIG. 2A), facing towards the opening 13, of the rigid sealing layer portions 11a to 11f, and in the example shown also a further uninterrupted sealing contour 14b at an outer edge 15a', 15b' (FIG. 2A), facing away from the opening 13, of the seal 10. The properties of the uninterrupted sealing contours 14a, 14b of this example are explained more precisely by way of example in the following figures on the basis of the inner uninterrupted sealing contour 14a.

In this embodiment, the rigid sealing layer portions 11a to 11f also each comprise holes 16, which can be both positioning holes and screw holes, for corresponding securing means. These can be in the form of conventional round holes, as shown, but they can also have a special shape in order to improve the electromagnetic compatibility, for example such that they establish direct metal-metal contact with the fastener, for example a screw, when in the installed state owing to special rough areas on their surfaces.

A width b of the seal 10 in the main extension plane is constant in a plurality of regions. In certain embodiments, at the transition from a rigid sealing layer portion 11a to 11f to a flexible sealing layer portion 12a to 12f adjoining the rigid sealing layer portion 11a to 11f, there may be no significant change to the width b of the seal 10.

Figure 2A:
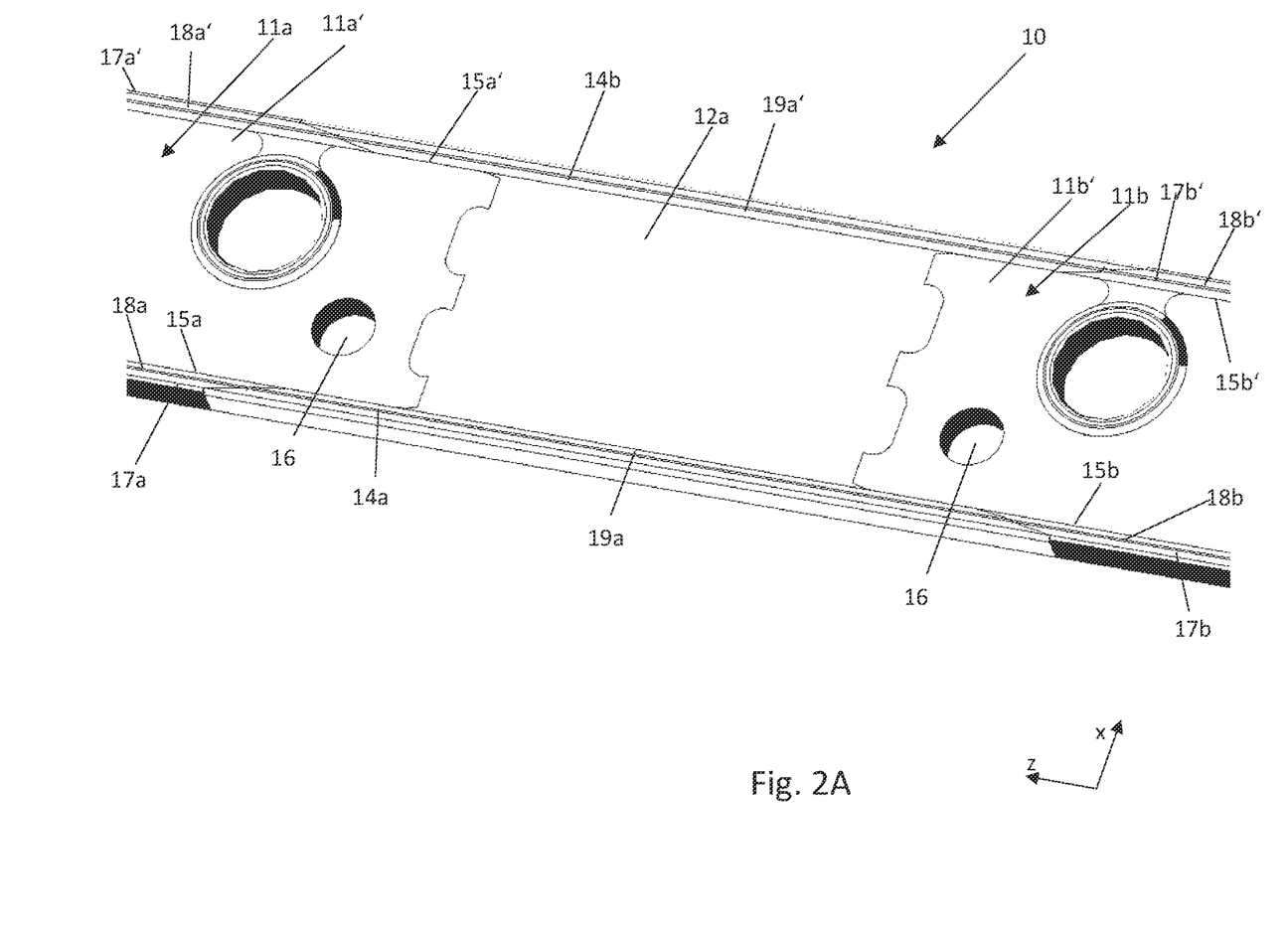
FIG. 2A shows an enlarged detail of the seal from FIG. 1B.

FIG. 2A now shows detail 20 from FIG. 1B. In this case, the two rigid sealing layer portions 11a, 11b comprise the inner edges 15a, 15b and the outer edges 15a', 15b', and the end-side edges 15a", which are oriented in opposite directions to one another (FIG. 3A), of support elements 11a', 11b' associated with the rigid sealing layer portions 11a, 11b. An elastomer of the flexible sealing layer portion 12a is arranged between the end edges 15a". In the present case, the two rigid sealing layer portions 11a, 11b each comprise two sealing soft components 17a, 17a' and 17b, 17b', respectively. In the process, the inner sealing soft components 17a, 17b in the present case form an inner partial sealing contour 18a, 18b of the continuous inner sealing contour 14a, and the outer sealing soft components 17a', 17b' form respective outer partial sealing contours 18a', 18b' of the continuous outer sealing contour 14b. In the present case, the connecting flexible sealing layer portion 12a accordingly forms an inner partial sealing contour 19a and an outer partial sealing contour 19a', which, together with the inner and outer partial sealing contours 18a, 18b, 18a', 18b', form the inner and outer continuous sealing contour 14a, 14b, respectively. In the present case, the length L (FIG. 1B) of the connecting flexible sealing layer portion 12a denotes the length over which the flexible sealing layer portion 12a is connected to its elastomer between the end-side edges 15a" of the adjacent support elements 11a', 11b', i.e. the support elements 11a', 11b' of the rigid sealing layer portions 11a, 11b connected by the relevant flexible sealing layer portion 12. In this example, the length L thus does not extend into the regions in which the partial sealing contours 19a, 19a' are arranged adjacently to the edges of the support elements 11a', 11b' or in which the support elements 11a', 11b' are molded with the elastomer of the flexible sealing layer portion 12a.

In the process, the inner partial sealing contours 18a, 18b, 19a, together with the corresponding partial sealing contours of the other sealing layer portions 11c to 11f and 12b to 12f, respectively, form the inner uninterrupted sealing contour 14a. Accordingly, the outer parts of the sealing contours 18a', 19a', and 18b', together with the partial sealing contours of the further sealing layer portions 11c to 11f, 12b to 12f, form the outer sealing contour 14b. In the example shown, the illustrated detail 20 accordingly also depicts the other rigid sealing layer portions 11c to 11f together with the associated connecting flexible sealing layer portions 12b to 12f.

In the present case, the sealing soft components 17a, 17a', 17b, 17b' are moulded onto the associated support elements 11a', 11b' at the corresponding inner edges 15a, 15b and outer edges 15a', 15b' of the respective rigid sealing layer portions 11a, 11b. In the process, the sealing soft components 17a, 17a', 17b, 17b' are moulded along the edges 15a, 15a', 15b, 15b', in the example shown only for one portion each of the relevant rigid sealing layer portion 11a, 11b, i.e. the sealing soft components 17a, 17a', 17b, 17b' do not extend fully along the respective edges 15a, 15a', 15b, 15b'. Instead, in the present case, the elastomer of the flexible sealing layer portion 12a is moulded directly on the remaining support element 11a', 11b' portions that are not covered by the sealing soft components 17a, 17a', 17b, 17b'. In the example shown, the elastomer of the flexible sealing layer portion 12a thus also forms the two partial sealing contours 19a, 19a' in addition to the flexible sealing layer portion 12a. In the present case, the elastomer of the flexible sealing layer portion 12a encompasses the respective support elements 11a', 11b' of the rigid sealing layer portions 11a, 11b directly at the end region 50 (FIG. 3A) of the relevant support element 11a', 11b'.

Figures 2B, 2C:
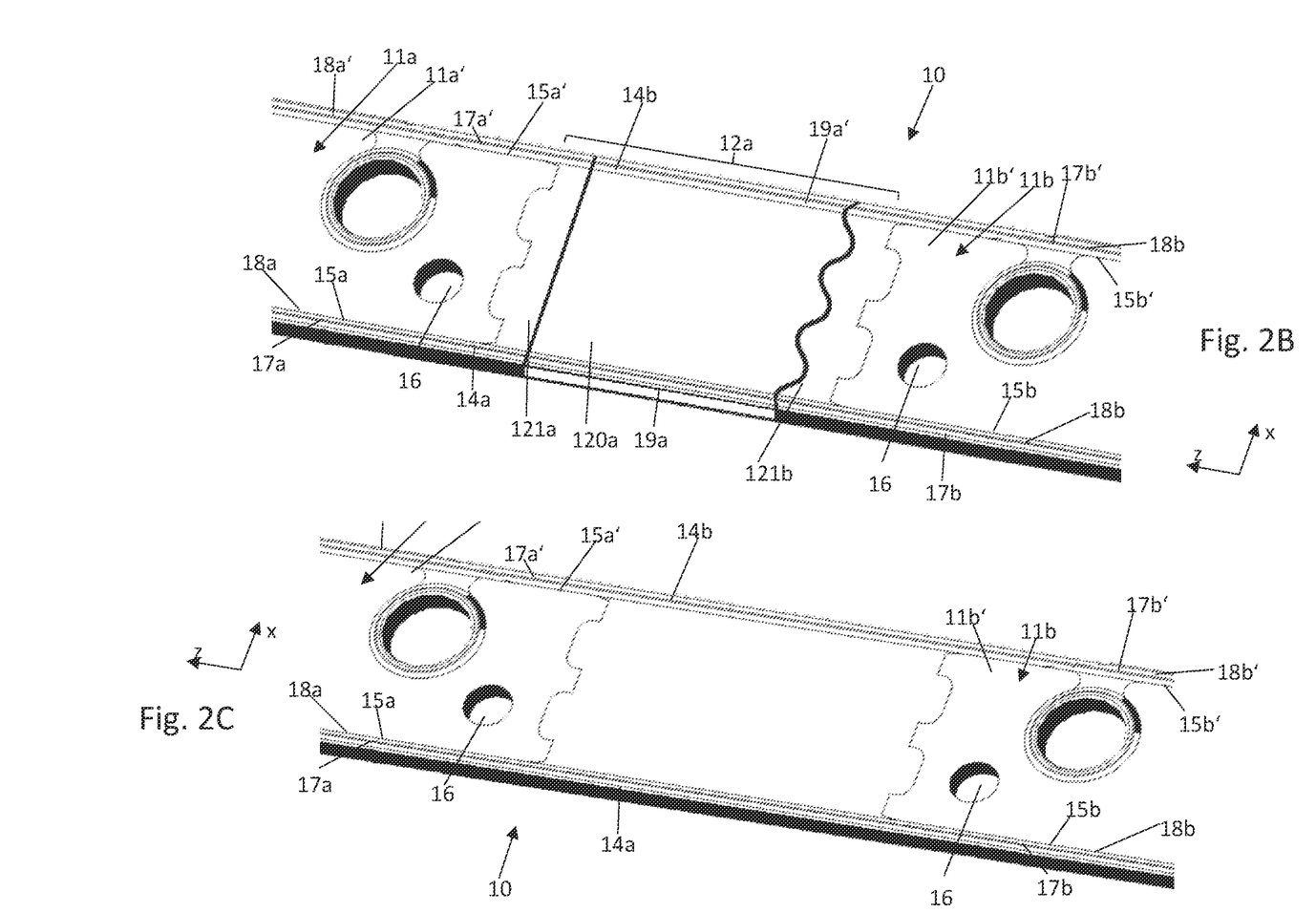
FIG. 2B shows a comparable detail of a variant of a seal.
FIG. 2C shows a comparable detail of a variant of a seal.

FIGS. 2B and 2C each show a detail of an alternative embodiment of a seal 10 in a section comparable to FIG. 2A. Unlike in FIG. 2A, in FIG. 2B the flexible sealing layer portion 12a does not consist of a single element, but comprises three successive portions 121a, 120a and 121b in the circumferential direction of the seal, i.e. in the direction from the rigid sealing layer portion 11a to the rigid sealing layer portion 11b. For example, the connection portion 121a can be moulded onto the rigid sealing layer portion 11a together with the sealing contour portions 17a, 17a'. Similarly, the connection portion 121b can be moulded together with the sealing contour portions 17b, 17b' to the rigid sealing layer portion 11b. The respective sealing contour portions 17a, 17a' and 17b, 17b' extend somewhat further than in the example of FIG. 2A. The two elements produced in this way are then joined by injecting a flexible connecting sealing layer portion 120a onto the facing edges of the connecting portion 121a, 121b. Therein, the associated partial sealing contours 19a, 19a' can also be moulded onto. It is advantageous if the facing edges of the connection portions 121a, 121b and the associated ends of the sealing contour portion 17a, 17a', 17b, 17b' are machined, for example cut, in an intermediate step. As shown, straight or wavelike cutting lines can be used. Other edge courses are also possible, for example non-rectilinear, with kinks and— unlike in the examples shown—not at right angles to the course of the sealing contour portions. The moulding of the flexible sealing layer portion 12a to the end-side edges 15a'' (cf. FIG. 3A, or 15b'') is thus performed here via the connection portions 121a, 121b.

In FIG. 2C, at least the elastomer portions in the shown section are all continuously moulded on in one gating or moulding step, so there are no separate partial sealing contours 19a, 19a' of the flexible sealing layer portion 12a, since these are formed as direct, seamless continuations of the sealing contour portions 17a, 17a', 17b, 17b'.

Figure 3A:
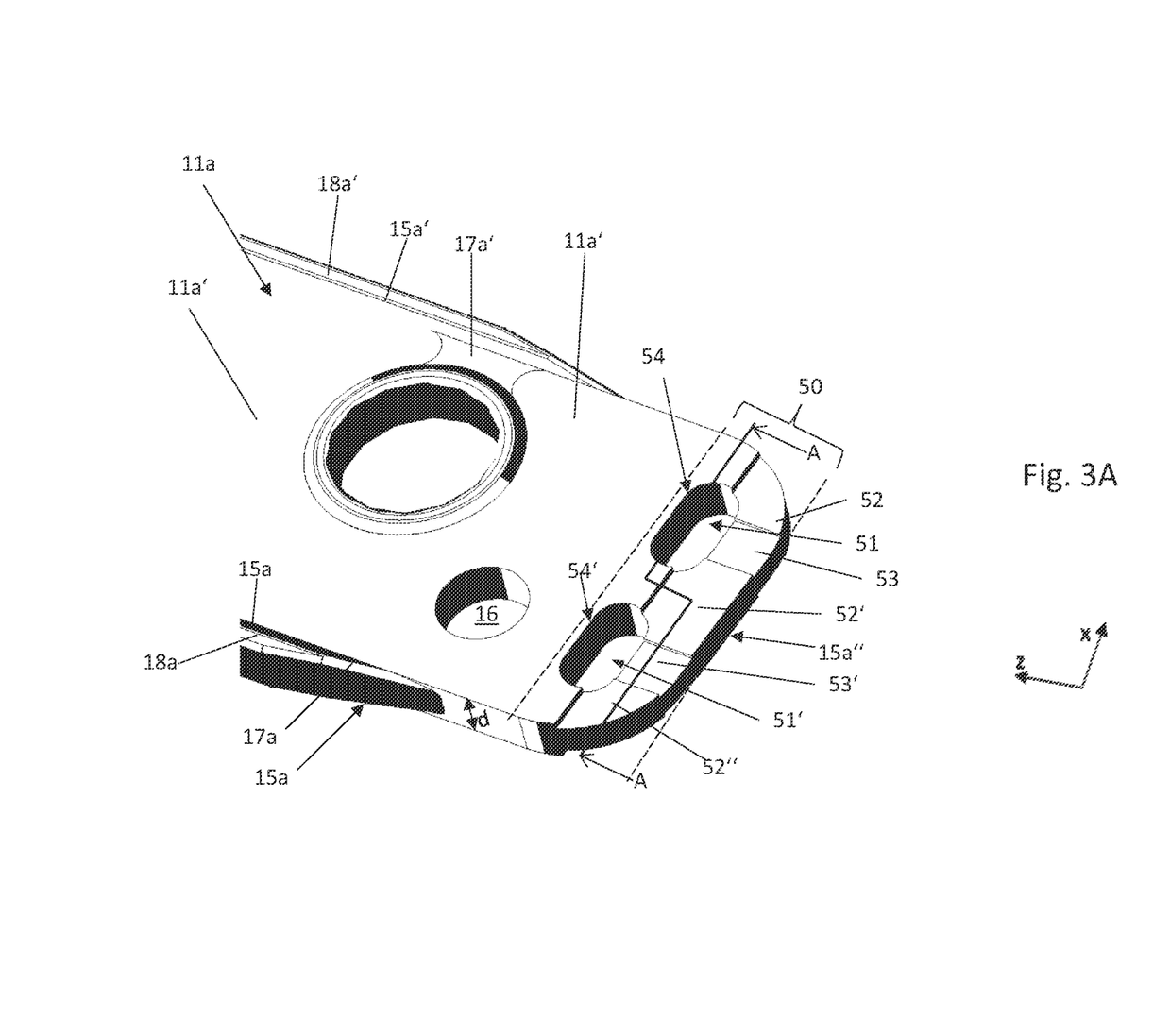
FIG. 3A shows an enlarged rigid sealing layer portion from FIG. 2A without the associated flexible sealing layer portion.

By way of example, FIG. 3A now shows the rigid sealing layer portion 11a having the associated support element 11a' without the flexible sealing layer portion 12a. The further support element 11b' or the rigid sealing layer portions 11b to 11f can be configured similarly. The support element 11a' thus comprises at least one through-opening 51, 51' (in the present case two through-openings) in the end region 50 adjoining the flexible sealing layer portion 12a. In the present case, these through-openings are formed as slots, the longitudinal axes of which are oriented transversely to a longitudinal direction, i.e. in the present case in the x-direction transversely to the z-direction as the longitudinal direction or periphery direction D. The thickness d of the support element 11a' in the y-direction is lower in at least one first end-side coining region 52, 52', 52'' (in the present case three first end-side coining regions), in which the support element 11a' is coined, than outside the end region 50 and/or than in the uncoined end region. In at least one second end-side coining region 53, 53' (in the present case two second end-side coining regions) of the support element 11a', the thickness thereof is further reduced compared with the first end-sided coining regions 52, 52', 52''.

In the example shown, first and second end-side coining regions 52, 53, 52', 53', 52'' are arranged along the end-side edge 15a'' and thus alternately directly one after the other in the x-direction. Embodiments of the second end-side coining regions 53, 53' adjoin the rest of the end region 50 not associated with the second coining region 53, 53' only at the first coining regions 52, 52', 52''. In the process, the second end-side coining regions 53, 53' also adjoin the end-side edge 15a'' of the support element 11a' and the edges 54, 54' of the through-opening 51 and 51', respectively.

In FIG. 2A, the different coining regions 52, 52', 53, 53', 52'' are entirely enclosed by the elastomer of the flexible sealing layer portion 12a. The first end-side coining regions 52, 52', 52'' also adjoin the end-side edge 15a'' of the relevant support element 11a, as well as a part of the edges 54, 54' of the through-openings 53, 53' that accounts for less than half the length of the edges 54, 54' of the through-openings 53, 53'. Accordingly, at the edge 54, 54' of the through-opening 51, 51', 51'', the elastomer of the flexible sealing layer portion 12a in FIG. 2A adjoins the support element 11a in a manner flush therewith.

Figure 3B:
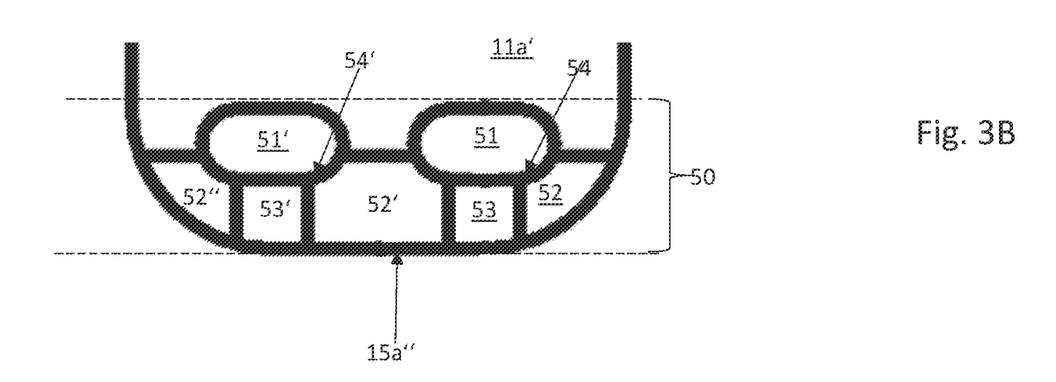
FIG. 3B is a plan view of the support element end region shown in FIG. 3A.
Figure 3C:
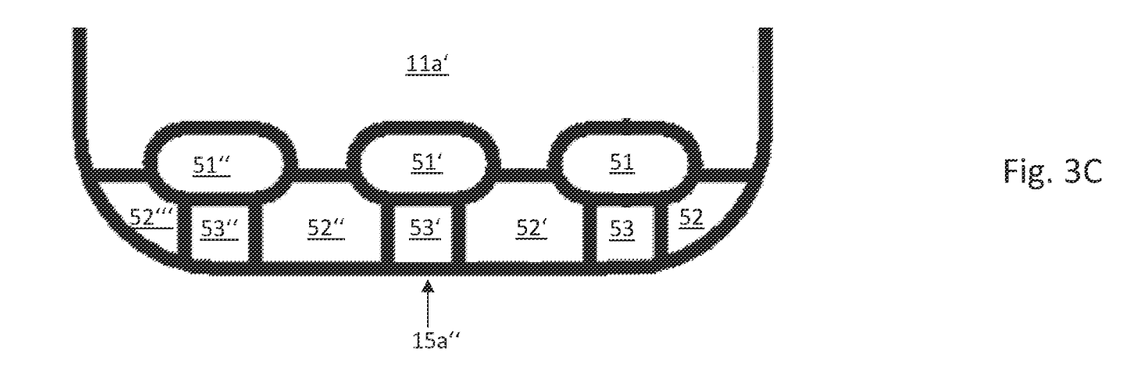
FIG. 3C is a plan view of an alternative form of the support element.

FIG. 3B is a plan view of the support element 11a' from FIG. 2A. Similarly, FIG. 3C shows a variant of the support element 11a' having three through-openings 51, 51', 51'' and accordingly four similarly arranged first coining regions 52-52''', in this case likewise with the different coining regions 52 to 53'' being arranged alternately.

FIG. 4 is a perspective view, by way of example, of the above-described seal 10 in an example folded or bent state. In this figure, it is clear that a material transition M between the sealing soft components 17a, 17a', 17b' and the elastomer of the flexible sealing layer portion 12a extends transversely to the course direction D of the seal 10, and, in the example shown, in the course direction D offset from a further material transition M' between the elastomer of the flexible sealing layer portion 12a and the respective support elements 11a', 11b' of the rigid sealing layer portions 11a, 11b. In the process, the further material transition M' also extends at least over a major part of the width b of the seal 10, again transversely to the course direction D of the seal 10. What is not shown is the three-dimensional course of the material transitions M', M; due to its specific nature, the material transition M' disperses the occurring bending forces over a large region of the seal 10 in the course direction D, thereby preventing or reducing the damage fostered by the bending or folding, for example partial detachment of the elastomer of the flexible sealing layer portion 12a from the support element 11a', 11b'.

Figure 5:
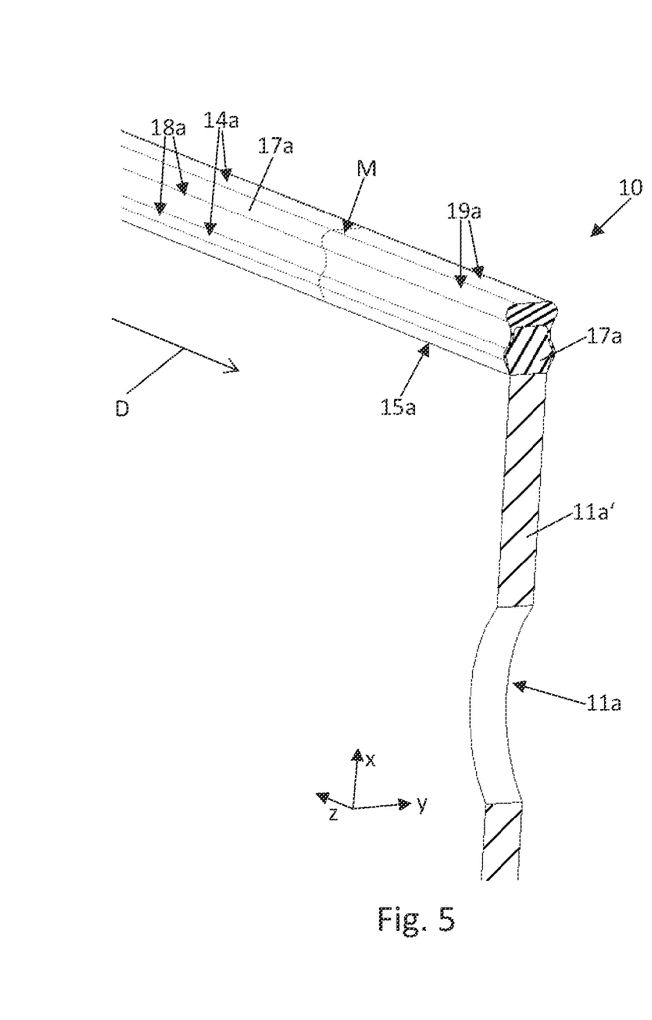
FIG. 5 is a perspective view of the example embodiment of a seal, with a sectional plane extending perpendicularly to the main extension plane.

FIG. 5 is a perspective sectional view of the seal 10. The sectional plane extends perpendicularly to the main extension plane of the seal, i.e. perpendicularly to the x-z plane and perpendicularly to the course direction D of the seal 10. In this example, an improved connection to the sealing soft component 17a of the rigid sealing layer portion 11a along the edge 15a, is formed by the elastomer of the flexible sealing layer portion 12a, in some regions, moulded, in an encompassing manner, onto the sealing soft component 17a, where it forms the partial sealing contour 19a. Accordingly, the sealing soft component 17a is no longer visible from the exterior downstream of the visible material transition M in the course direction D, but it continues below the elastomer of the flexible sealing layer portion 12a in the direction of the end edge 15a" (FIG. 3A) of the support element 11a' so as to thus achieve an improved service life and sealing performance. A transition of this kind is possible not only when the sealing contour 14a has a double profile, as shown here, but also when the sealing contour 14a has a single profile or when the sealing contour 14a has a profile in another form.

Figure 6:
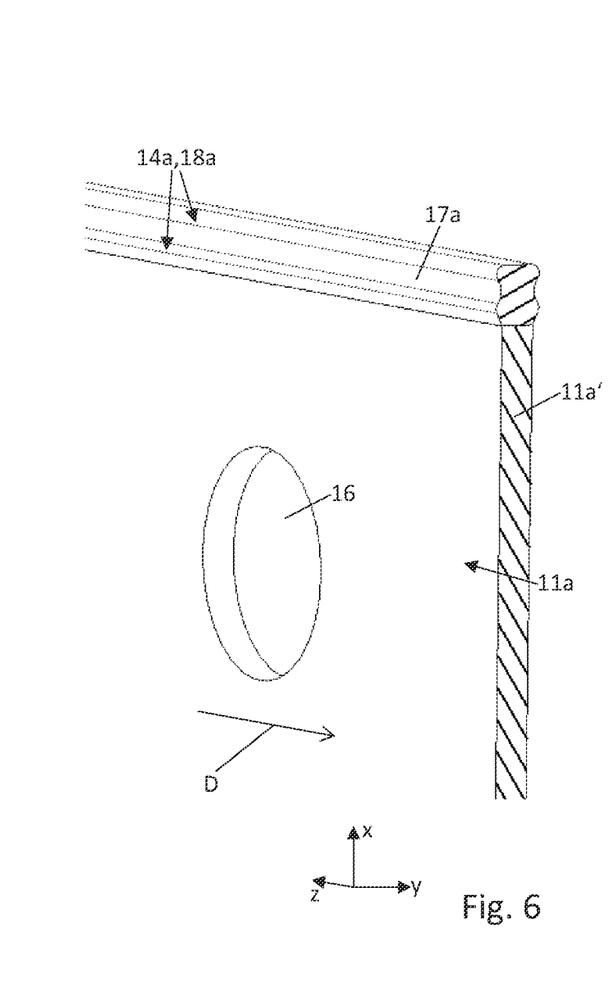
FIG. 6 is a further perspective view of the seal from FIG. 5, with a sectional plane that has been shifted along the course of the seal.

FIG. 6 is a perspective sectional view corresponding to FIG. 5, but the sectional plane has been shifted in the opposite direction to the course direction D of the seal. Accordingly, the elastomer of the flexible sealing layer portion 12a (FIG. 5) is no longer visible; only the support element 11a' having the sealing soft component 17a attached thereto and the (partial) sealing contour 14a, 18a can be seen. A corresponding view also results, for instance, from a section through the support element 11a' and the sealing soft components 17a, 17a' in the example of FIG. 2C.

Figure 7:
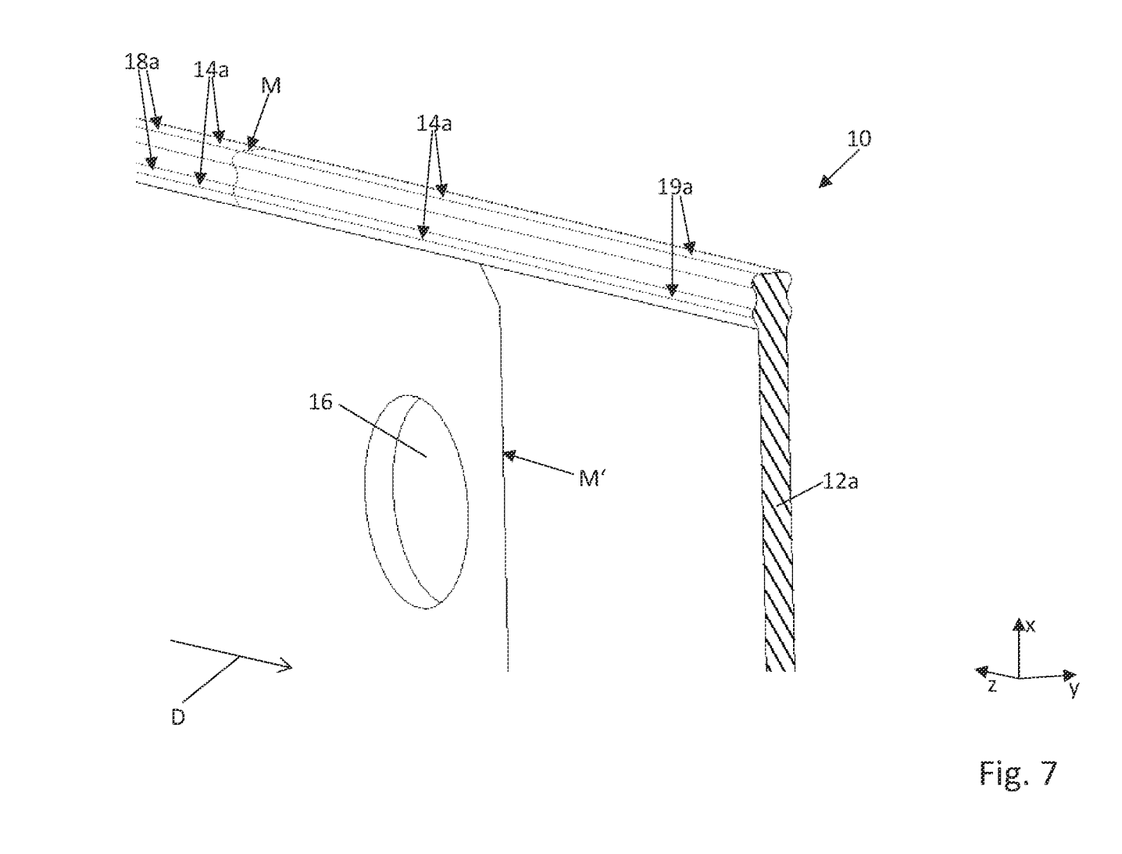
FIG. 7 is a further perspective sectional view of the example from FIG. 5, with a sectional plane that has been shifted again along the course of the seal compared with the view in FIG. 6.

Lastly, FIG. 7 is a related perspective sectional view in which the sectional plane has been shifted in the positive course direction D of the seal 10 compared with FIG. 5. In this case, only the flexible sealing layer portion 12a can be seen at the section surface; accordingly, the seal 10 is formed entirely by the elastomer of the flexible sealing layer portion 12a, even in the region of the partial sealing contour 18a, and not, as shown in FIG. 5, in part by the elastomer of the flexible sealing layer portion 12a and in part by the sealing soft component 17a of the rigid sealing layer portion 11a.

Figure 8:
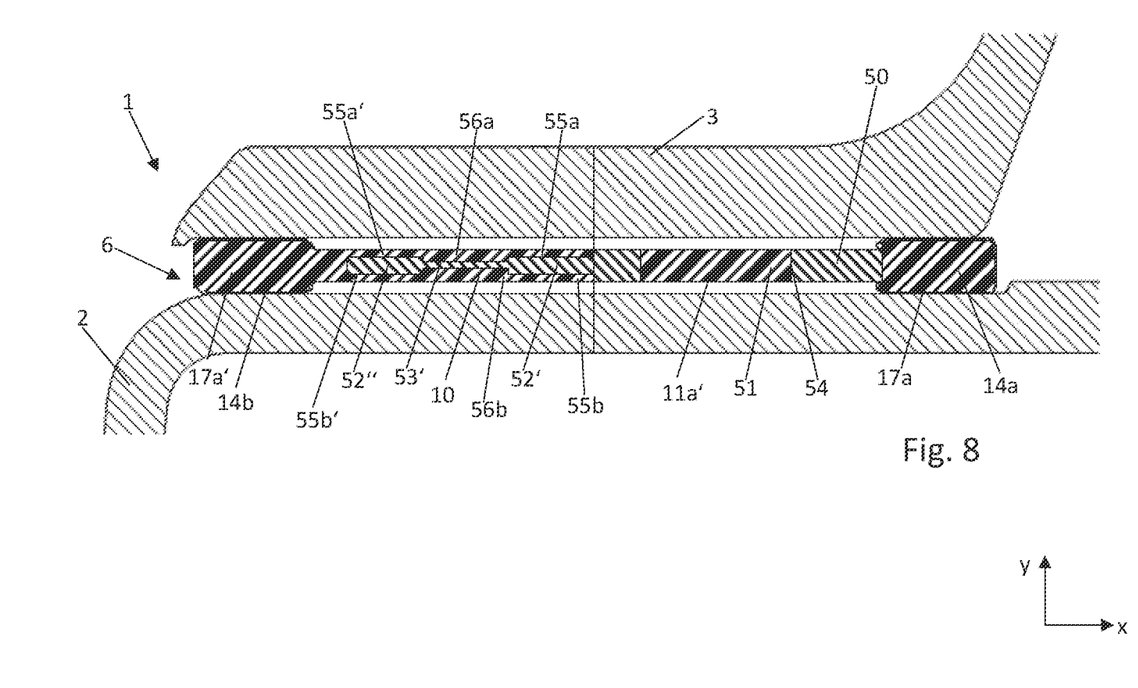
FIG. 8 is a sectional view of an embodiment of a seal in the installed state, the section through the support element following line A-A in FIG. 3A.

FIG. 8 is an angled sectional view of a seal 10 in the installed state, the section following line A-A in FIG. 3A. In this case, FIG. 8 shows a seal 10 having two sealing contours 14a, 14b that is installed in the gap 6 between the lid 3 and the trough 2. The sealing contour 14b is moulded onto the side edge of the end region 50 of the support element 11a'. The elastomer of the sealing contour 14b fills the through-opening 51 in its entirety, and in the process the elastomer adjoins the side edge 54 of the through-opening 51 in a manner flush therewith. Beyond the bend point in the sectional view, an elastomer skin 55a, 55b is present on the top and underside of the support element 11a'; since here the section runs through the first coined region 52', the sheet thickness is thus thinner than to the right thereof. In the adjacent second coined region 53', the support element 11a' is then thinner than in the region of the first coined region 52' and the elastomer skin 56a, 56b is accordingly thicker. Beyond the second coined region 53' is a further portion of a first coined region 53" having second elastomer skins 55a', 55b', before the seal 10 merges into a support-free portion, where it forms the sealing contour 14b. The deliberate stepping of the various regions of the end region 50 ensures significantly adhesion of the elastomer, which also forms a flexible sealing layer portion 12a outside the sectional plane.

FIGS. 1A-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A seal for sealing an inner chamber of a housing from an exterior of the housing, the seal including at least one sealing layer which comprises:
   at least two rigid sealing layer portions having a respective support element, the rigid sealing layer portions being interconnected by a flexible sealing layer portion, which consists of or comprises, at least in part, an elastomer; and
   at least one sealing contour, which extends continuously over the different sealing layer portions,
   wherein the support elements each comprise, in an end region adjoining the flexible sealing layer portion, at least one through-opening, through which the elastomer of the flexible sealing layer portion extends, and the end region of each support element is coined in at least one first end-side coining region and is enclosed by the elastomer in the first end-side coining region at least in some regions.

2. The seal according to claim 1, wherein the support elements each have two or more through-openings, which are configured as slots and/or are arranged in a row transversely to a longitudinal direction of the support elements.

3. The seal according to claim 1, wherein the at least one first end-side coining region adjoins an edge of the through-opening and an end-side edge of the relevant support element, adjoining the edge of the through-opening over less than half a length of the edge.

4. The seal according to claim 1, wherein the end region of each support element is also coined in at least one second coining region and is enclosed by the elastomer in the second end-side coining region at least in some regions, a coining depth of the second end-side coining region being greater than a coining depth of the first end-side coining region.

5. The seal according to claim 4, wherein the at least one second end-side coining region adjoins the edge of the through-opening and the end-side edge of the relevant support element.

6. The seal according to claim 4, wherein the at least one second end-side coining region adjoins the rest of the end region not associated with the second coining region only at the at least one first end-side coining region.

7. The seal according to claim 4, wherein the first and second end-side coining regions are arranged alternately on the end-side edge of each support element.

8. The seal according to claim 1, wherein at the edge of the through-opening, the elastomer is flush with the relevant support element.

9. The seal according to claim 1, wherein the support elements are metal support elements comprising or made of aluminum or comprising or made of a steel material.

10. The seal according to claim 1, wherein two rigid sealing layer portions are in each case foldably interconnected by the one flexible sealing layer portion.

11. A method for producing a seal for sealing an inner chamber of a housing from an exterior of the housing, the method comprising:
   providing the seal including at least one sealing layer, the sealing layer comprising:
      at least two rigid sealing layer portions, having a respective support element, and at least one flexible sealing layer portion, which consists of or comprises, at least in part, an elastomer; and
      at least one sealing contour, which extends continuously over the different sealing layer portions,
   making at least one through-opening in an end region, adjoining the flexible sealing layer portion, of each support element;
   coining each support element in at least one first end-side coining region of the associated end region; and
   molding the support elements with the elastomer in the respective coining regions and in the through-openings, thereby forming the flexible sealing layer portion and the sealing contour in the flexible sealing layer portion.

12. A method for producing a seal for sealing an inner chamber of a housing from an exterior of the housing, the method comprising:
   providing the seal including at least one sealing layer, the sealing layer comprising:
      at least two rigid sealing layer portions, having a respective support element, and at least one flexible sealing layer portion, which consists of or comprises, at least in part, an elastomer; and
      at least one sealing contour, which extends continuously over the different sealing layer portions,
   making at least one through-opening in an end region, adjoining the flexible sealing layer portion, of each support element;
   coining each support element in at least one first end-side coining region of the associated end region; and
   molding the support elements with the elastomer in the respective coining regions and in the through-openings, thereby forming at least a part of the flexible sealing layer portion and the sealing contour in the flexible sealing layer portion.

* * * * *